United States Patent [19]

Noda et al.

[11] Patent Number: 4,483,405
[45] Date of Patent: Nov. 20, 1984

[54] OMNIDIRECTIONAL MOTORIZED WHEELCHAIR

[75] Inventors: Takeo Noda, Tokyo; Ichiro Tsunaki, Hachioji, both of Japan

[73] Assignee: Koyu Enterprise, Inc., Hyogo, Japan

[21] Appl. No.: 400,695

[22] Filed: Jul. 22, 1982

[30] Foreign Application Priority Data

Aug. 5, 1981 [JP] Japan .................. 56-123548
Mar. 16, 1982 [JP] Japan .................. 57-40120

[51] Int. Cl.³ ............................ B62D 11/04
[52] U.S. Cl. ........................ 180/6.5; 180/199; 180/209; 180/236; 180/907
[58] Field of Search .......... 180/6.28, 6.5, 140, 180/199, 209, 236, DIG. 3, 6.24, 6.26, 6.48

[56] References Cited

U.S. PATENT DOCUMENTS 3,023,825 3/1962 Rabjohn .................. 180/209
3,305,116 2/1967 McKee .................... 180/236
3,814,199 6/1974 Jones ...................... 180/6.5
4,207,959 6/1980 Youdin et al. ............. 180/6.5

FOREIGN PATENT DOCUMENTS

2810420 9/1978 Fed. Rep. of Germany ....... 180/6.5

Primary Examiner—David M. Mitchell
Assistant Examiner—Kenneth R. Rice
Attorney, Agent, or Firm—Armstrong, Nikaido, Marmelstein & Kubovcik

[57] ABSTRACT

An omnidirectional motorized wheelchair having front wheels consisting of a pair of free wheels, and rear wheels consisting of motor-operated wheels driven by electric motors independently of each other. This wheelchair can be moved forward and backward, turned to right and left, and turned in a fixed position. The motor-operated wheels are moved pivotally in the opposite directions by a steering unit to set these wheels to face in the lateral direction with respect to the rider. Thus, the wheelchair can be moved in the lateral direction with the rider facing forward, and it can also be turned while it is moved in the lateral direction.

6 Claims, 18 Drawing Figures

OMNIDIRECTIONAL MOTORIZED WHEELCHAIR

BACKGROUND OF THE INVENTION

1. Field of the Invention

This invention relates to an omnidirectional motorized wheelchair having front wheels consisting of two independent casters, and rear wheels consisting of two independent motor-operated wheels, and more particularly to an omnidirectional motorized wheelchair, which can be operated by a rider with the rider remaining to face in the forward direction, so as to be moved straight or turned even in a lateral direction, and which can be moved to a desired place easily and reliably with the wheelchair facing in any direction, by using a combination of the mentioned novel wheelchair-operating techniques and conventional wheelchair-advancing, retreating, turning and direction-changing techniques.

2. Description of the Prior Art

A conventional motorized wheelchair generally has front wheels consisting of a pair of casters, and rear wheels consisting of a pair of motor-operated wheels fixed to a wheelchair body and driven independently of each other by reversible, varying-speed DC motors. The direction of rotation and rotational speeds of the right and left motor-operated wheels are varied by reversing the power source connection of the DC motors and regulating input voltages therefor, to thereby vary the direction of movement of the wheelchair. Thus, a conventional motorized wheelchair can be advanced, retreated, turned to right and left, and turned round in a stopped state, very easily. However, this conventional motorized wheelchair having motor-operated wheels fixed to the wheelchair body cannot be moved laterally with a rider remaining to face in the forward direction. A conventional motorized wheelchair, to which front wheel control units for automobiles are applied, does not permit its motor-operated wheels to be directed sideways with respect to a rider, and cannot be moved laterally with the rider remaining to face in the forward direction. Accordingly, the rider on such a motorized wheelchair cannot carry out such kind of work that requires his wheelchair to be moved laterally with his body left directed forward. Namely, the rider on such a wheelchair cannot, for example, write letters on a blackboard smoothly, or apply paint on a wall easily, and feels great inconvenience.

SUMMARY OF THE INVENTION

An object of the present invention is to provide an excellent omnidirectional motorized wheelchair having front wheels consisting of a pair of casters, and rear wheels consisting of a pair of independent motor-operated wheels, which permits directing its motor-operated wheels sideways with respect to a rider, to move the wheelchair laterally with the rider remaining to face in the forward direction, whereby the wheelchair permits a leg-disabled person to carry out such kind of work that he has heretofore despaired of doing due to his inconvenient wheelchair, which cannot be moved laterally.

Another object of the present invention is to provide an omnidirectional motorized wheelchair, which is provided with a mechanism capable of turning the wheelchair even while the wheelchair is moved laterally with a rider remaining to face in the forward direction, and regulating the direction of movement of the wheelchair while it is moved laterally, and which permits a leg-disabled person on the wheelchair to move finely in the lateral direction, and do a wider range of jobs.

Still another object of the present invention is to provide an omnidirectional motorized wheelchair, which permits being not only moved forward and backward, turned to right and left, and turned in a fixed position, just as a conventional wheelchair, but also moved and turned laterally, by the same steering means.

In order to achieve these objects, the present invention provides an omnidirectional motorized wheelchair having front wheels consisting of a pair of free wheels (two independent casters), and rear wheels consisting of independent motor-operated wheels, comprising king pins, via which the motor-operated wheels are connected rotatably to a frame constituting a wheelchair body, tie rod arms connected fixedly to the king pins, a motor-operated steering unit provided between the motor-operated wheels and having a rotary steering shaft, and pivotable member joined fixedly to the steering shaft, the pivotable member and tie rod arms being connected together by tie rods, the motor-operated wheels being rotated in the opposite directions in accordance with the rotation of the rotary steering shaft to set the motor-operated wheels to face in the lateral direction with respect to a rider, the movements of the motor-operated wheels being controlled by an omnidirectional lever and a lateral movement control switch, which are provided on a control box on the wheelchair body, or a vocal actuator and vocal operational instruction words, which are provided on the wheelchair body.

BRIEF DESCRIPTION OF THE DRAWINGS

FIGS. 5–7 are enlarged views illustrating the construction of an example of a steering unit provided in a cover for a body of the omnidirectional motorized wheelchair according to the present invention, wherein

DETAILED DESCRIPTION OF THE PREFERRED EMBODIMENTS

FIGS. 1-4 are a side elevational view, a front elevational view, a bottom view and a plan view, respectively, of an embodiment of the present invention. Referring to these drawings, front wheels 2 consist of free wheels joined to a chassis 3 of a wheelchair 1 in such a manner that the front wheels 2 can face in all directions. Rear wheels 4 consist of motor-operated wheels driven by DC motors $M_1$, $M_2$ via gear boxes 5, which motors $M_1$, $M_2$ have as power sources therefor batteries 7 provided under a seat 6. Reference numeral 8 denotes a seat back, 9 foot rests, 10 a control box provided in front of one of arm rests 11, and 12 a cover for a wheelchair body.

Figure 1:
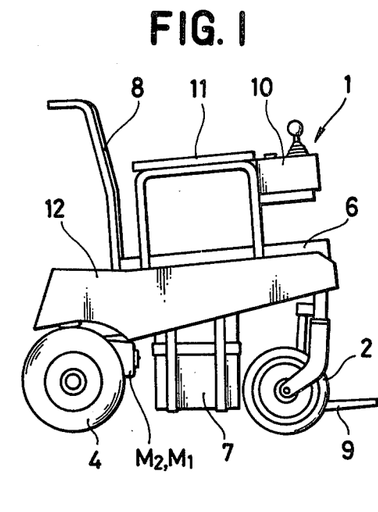
FIGS. 1–4 are a side elevational view, a front elevational view, a bottom view and a plan view, respectively, of an embodiment of an omnidirectional motorized wheelchair according to the present invention.
Figure 2:
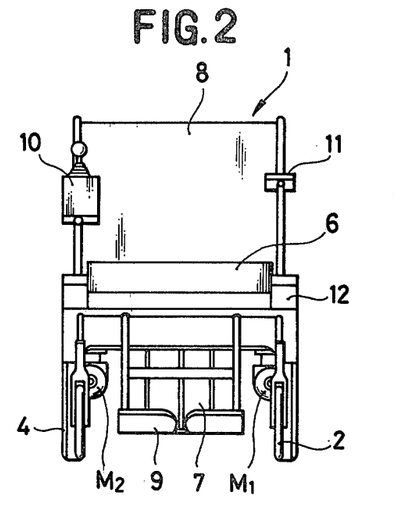
Figure 3:
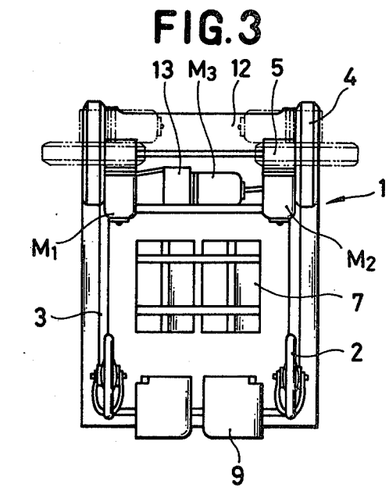
Figure 4:
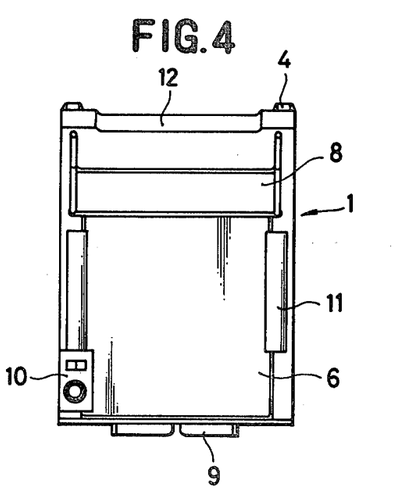

In the omnidirectional motorized wheelchair 1 according to the present invention, which has the abovedescribed outer construction, a steering unit for the rear wheels 4 is installed in the inside of the cover 12. The steering unit is adapted to be driven via a steering unit driving mechanism 13 by a DC motor $M_3$, the position of which is shown in FIG. 3, to make the rear wheels 4 face in the lateral direction as shown in chain line in FIG. 3.

Figure 5:
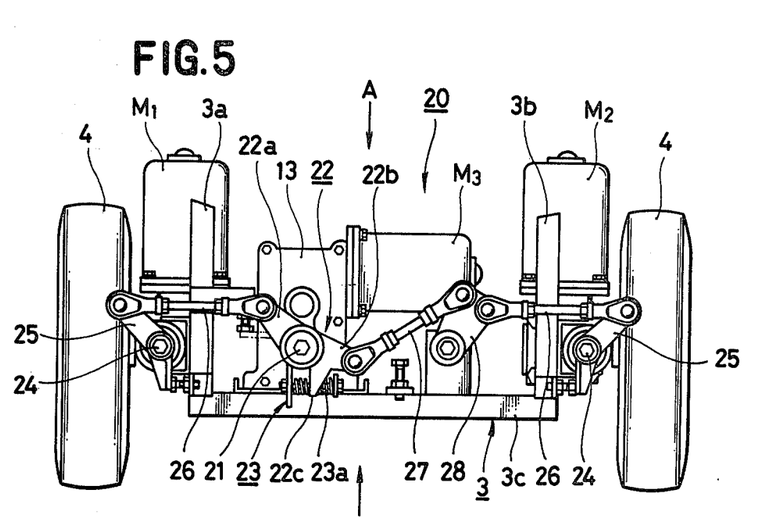
FIG. 5 is a plan view and FIGS. 6 and 7 are elevational views taken in the directions of arrows A and B, respectively.
Figure 6:
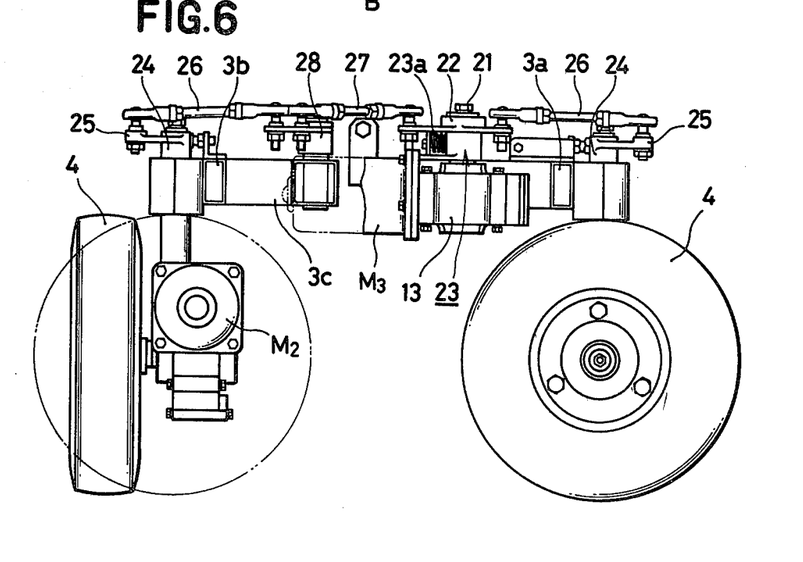
Figure 7:
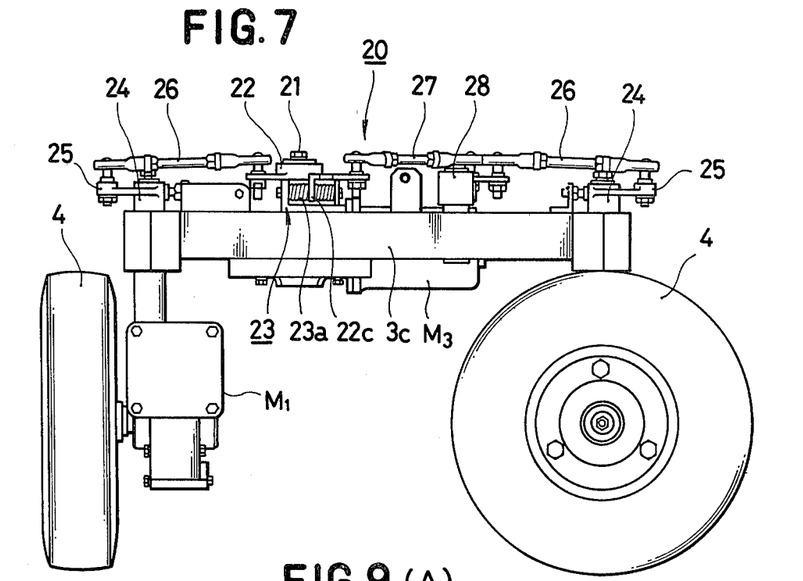

FIGS. 5-7 are enlarged views showing the construction of an example of the steering unit 20 installed inside the cover 12 for the wheelchair body, wherein FIG. 5 is a plan view; and FIGS. 6 and 7 are elevational views taken in the directions of arrows A and B in FIG. 5.

In this embodiment, the steering unit driving mechanism 13, which is driven by the DC motor $M_3$ is mounted on a frame 3c, by which side frames 3a, 3b of the chassis 3 are connected together. The driving mechanism 13 is adapted to rotate a driving shaft 21 projecting upward therefrom. A pivotable arm 22 having arm members 22a, 22b clamping the driving shaft 21 from both sides thereof is fixed thereto. When the pivotable arm 22 is in the position shown in FIG. 5, it is unitarily fixed to the driving shaft 21 but, when the arm 22 is moved pivotally by the driving shaft 21 to a certain position, the former is disengaged from the latter. A direction selector unit 23, which has coiled springs 23a sandwiching therebetween a locking member 22c provided at a base portion of the arm member 22b of the pivotable arm 22, and which is capable of regulating the steering unit, is fixed to the driving shaft 21.

On the other hand, the rear wheels 4, which are driven by the motors $M_1$, $M_2$, are connected pivotably to the side frames 3a, 3b via king pins 24, the pivots thereof, in such a manner that the direction in which the rear wheels 4 face can be varied. Each of the king pins 24 is provided thereon with a tie rod arm 25, a pivotable member, which projects therefrom. The free end portions of the tie rod arms 25 and those of the arm members 22a, 22b of the pivotable arm 22 fixed to the driving shaft 21 are connected together by tie rods 26, a kind of links. Since the steering unit driving mechanism 13 in this embodiment is not positioned halfway between the side frames 3a, 3b, the free end portion of the tie rod arm 25 which is farther from the steering unit driving mechanism 13 and that of the arm member 22b are connected together via a relay rod 27. Reference numeral 28 denotes a relay arm pivotably connected to the frame 3c and adapted to accurately transmit the movement of the relay rod 27 to the tie rod 26.

When the steering unit driving mechanism 13 is positioned halfway between the side frames 3a, 3b with the driving shaft 21, which is provided thereon, in a position equidistant from the rear wheels 4, the relay rod 27 and relay arm 28 are, of course, not required. In such a case, the free end portions of the tie rod arms 25 and those of both of the arm members of the pivotable arm 22 can be connected together by tie rods 26 of the same length.

FIGS. 6 and 7 show the condition of the rear wheels 4, one of which faces in the longitudinal direction, and the other of which has been set to face in the lateral direction, for the convenience of describing the operation of the steering unit. However, in practice, the movements of the rear wheels 4 are not controlled in such a separate manner as shown in these drawings. The condition of the steering unit 20 shown in the same drawings is identical with that thereof shown in FIG. 5.

Figure 8:
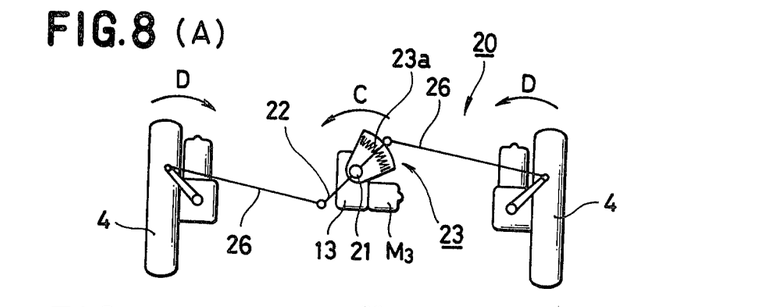
FIGS. 8A–8D are schematic plan views illustrating the principles of operation of the steering unit for the motorized wheelchair according to the present invention.

The principle of the steering unit 20 employed in the present invention, which is constructed as described above, will be explained with reference to schematic diagrams in FIG. 8, which illustrates an example in which the driving shaft 21 is positioned halfway between the rear wheels 4. The example shown in these schematic diagrams is not provided with such a relay rod as referred to above. FIG. 8A shows the condition of the steering unit 20 not in operation with the rear wheels 4 facing in the longitudinal direction. In this case, the pivotable arm 22 is fixed to the driving shaft 21. Reference numeral 23 denotes the direction selector unit having the coiled springs 23a.

When a rider then operates the rear wheels 4 so as to direct them laterally, the driving shaft 21 is turned by the steering unit driving mechanism 13, so that the pivotable arm 22 and direction selector unit 23, which are fixed to the driving shaft 21, are moved together from the positions shown in FIG. 8A, in the direction of an arrow C. Consequently, the rear wheels 4, which are connected to both end portions of the pivotable arm 22 via the tie rods 26, are moved pivotally in the inward direction of an arrow D with respect to the front side (upper side in the drawing) of the wheelchair to be put in the condition shown in FIG. 8B, in which both of the rear wheels 4 are set to face in the lateral direction. In the steering unit 20 employed in the present invention, the pivotable arm 22 is adapted to be disengaged from the driving shaft 21 and thereby set pivotally movable, only when both of the rear wheels 4 are set to face in the lateral direction as mentioned above.

When the rear wheels 4 are rotated at the same speed in the condition shown in FIG. 8B, no external force is applied to the pivotable arm 22. Accordingly, the pivotable arm 22, which are urged from both sides thereof by the coiled springs 23a with the equal force, is not moved. When the rear wheels 4 are rotated at different speeds, the external force generated due to the difference between the rotational speeds of the rear wheels 4 is applied to the pivotable arm 22 so as to turn the same. When this external force has become greater than the balancing force of the coiled springs 23a, the pivotable arm 22 is moved.

The direction, in which the pivotable arm 22 is moved, is determined depending upon the rotational direction of the rear wheels 4 and the difference between the numbers of revolutions per minute thereof. Referring to FIGS. 8C and 8D, let 4a and 4b equal the rear wheel on the right side (shown in right-hand portions of the drawings) with respect to the length of the wheelchair, and the other rear wheel, respectively. The rear wheels 4a, 4b are set in the following manner. The rear wheels 4a, 4b are set as shown in FIG. 8C when both of them are rotated to left with the number of revolutions per minute (arrow E) of the right rear wheel 4a greater than that (arrow F) of the left rear wheel 4b, or when both of the rear wheels 4a, 4b are rotated to right with the number of revolutions per minute (arrow G) of the right rear wheel 4a smaller than that (arrow H) of the left rear wheel 4b. In these cases, the external force is applied to the pivotable arm 22 in the direction of an arrow I. The rear wheels 4a, 4b are set as shown in FIG. 8D when both of them are rotated to left with the number of revolutions per minute (arrow J) of the right rear wheel 4a smaller than that (arrow K) of the left rear wheel 4b, or when both of the rear wheels 4a, 4b are rotated to right with the number of revolutions per minute (arrow L) of the right rear wheel 4a greater than that (arrow M) of the left rear wheel 4b. In these cases, the external force is applied to the pivotable arm 22 in the direction of an arrow N.

Thus, when, in the motorized wheelchair according to the present invention, the rear wheels 4 are rotated at different speeds as mentioned above, after they have been set to face in the lateral direction (direction $O_1-O_2$ in FIGS. 8C and 8D), the motorized chair can be moved in the directions $P_1$, $P_2$, $Q_1$, $Q_2$ shown in FIGS. 8C and 8D.

Figure 9:
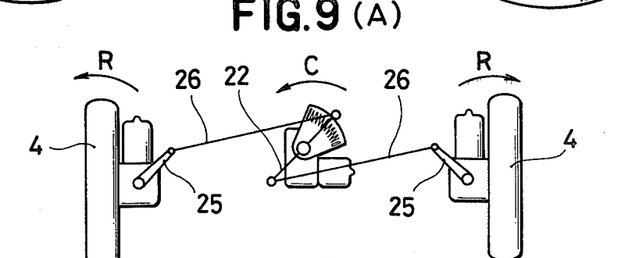
FIGS. 9A and 9B are schematic plan views illustrating the general construction of a modified example of the steering unit used in the present invention, and the condition of the rear wheels set to face in the lateral direction.

FIGS. 9A and 9B are schematic plan views illustrating the general construction of a modified example of the steering unit used in the present invention, and the condition of the rear wheels set to face in the lateral direction. In this example, the positions, in which the tie rod arms 25 are fixed, and the positions, in which the tie rods 26 are connected, are different from those in the example previously described. Therefore, when the pivotable arm 22 in FIG. 9A is turned in the direction of an arrow C in the same manner as in the previously-described example, the rear wheels 4 are moved pivotally in the direction of an arrow R, which is opposite to the direction in which the rear wheels 4 are moved pivotally under similar conditions in the previously-described example. As a result, the rear wheels 4 are set to face in the lateral direction.

When the rear wheels 4 in the above condition are rotated in the same manner as previously described, they are moved in the same manner as mentioned above owing to the operation of the direction selector unit 23. The operational characteristics of the motorized wheelchair having this steering unit are completely the same as those of the motorized wheelchair having the previously described steering unit.

Figure 10:
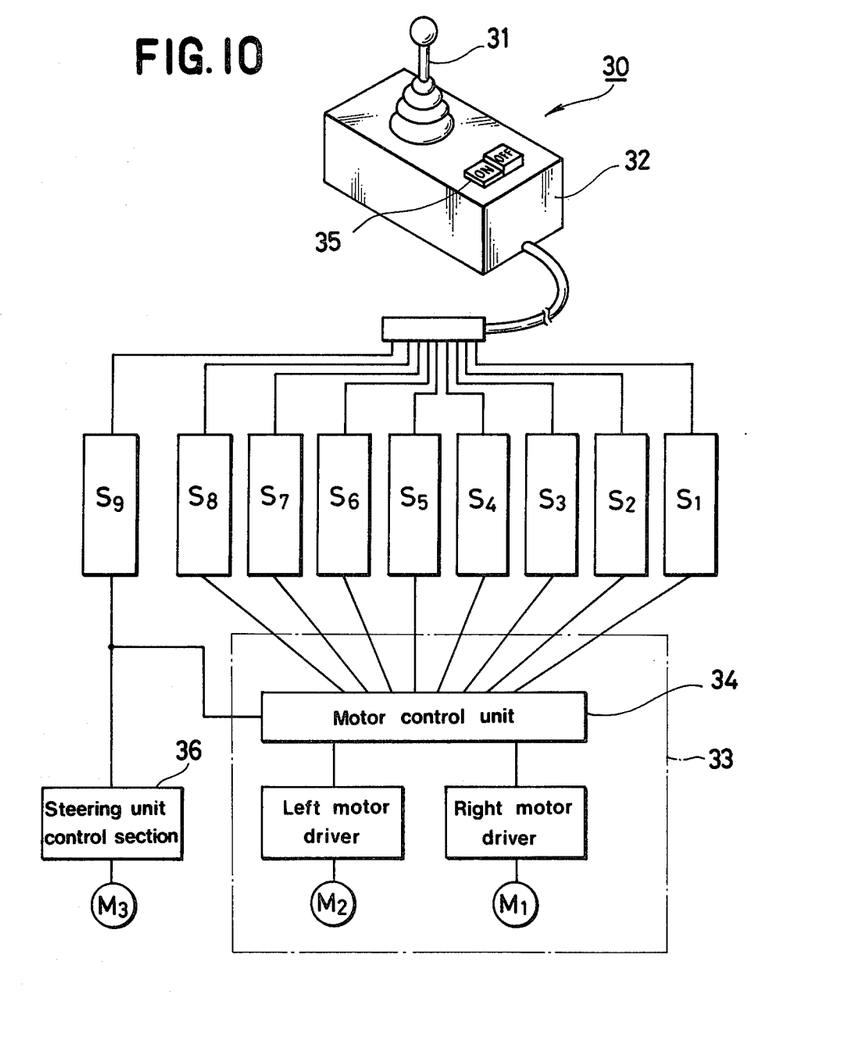
FIG. 10 is a construction diagram of an example of the control unit for the motorized wheelchair according to the present invention.

The motorized wheelchair according to the present invention having the above-described construction permits being moved in various modes by a control unit 30 shown in FIG. 10, which is provided with a unidirectional lever 31 just as a control unit in a conventional motorized wheelchair. In order to move the wheelchair in a regular mode, the lever 31 is brought down in the direction, in which the rider desires to move his wheelchair, one of right and left motor control signals $S_1$–$S_8$ (FIG. 10), which corresponds to the direction, in which the lever 31 has been brought down, is inputted from the control box 32 into a motor control unit 34 in a motor control section 33. As a result, the right and left motors $M_1$, $M_2$ are rotated independently of each other by the motor control unit 34 to allow the wheelchair to be moved in the direction in which the lever 31 was brought down.

Above recited motor control signals $S_1$–$S_8$ respectively mean as follows:

$S_1$: signal for the right motor $M_1$ to rotate the right rear wheel forward;

$S_2$: signal for the right motor $M_1$ to rotate the right rear wheel backward;

$S_3$: signal for the right motor $M_1$ to change its rotation speed;

$S_4$: signal for the right motor $M_1$ to stop;

$S_5$: signal for the left motor $M_2$ to rotate the left rear wheel forward;

$S_6$: signal for the left motor $M_2$ to rotate the left rear wheel backward;

$S_7$: signal for the left motor $M_2$ to change its rotation speed;

$S_8$: signal for the left motor $M_2$ to stop.

Figure 11:
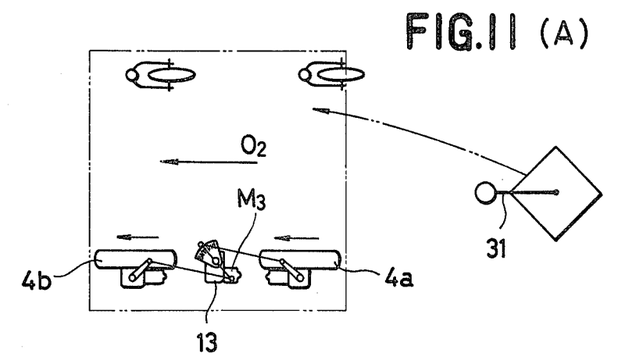
Figs. 11A–11C illustrate the motorized wheelchair according to the present invention, which has been set to face in the lateral direction by the control unit shown in FIG. 10.

When the rider desires to set the rear wheels to face in the lateral direction, and move his wheelchair in the lateral direction as he remains to face in the forward direction, a steering switch 35 (which will be hereinafter called "gyro-switch") provided on the control box 32 and used to direct the rear wheels laterally is turned on. Consequently, a gyro-signal $S_9$ is inputted from the control box 32 into a steering unit control section 36, and the rear wheels 4 are set to face in the lateral direction as shown in FIG. 11A, by the motor $M_3$ and steering unit driving mechanism 13. At the same time, the operation of the motor control unit 34 in the motor control section 33 is shifted from a regular operational mode to a gyrooperational mode.

Therefore, when the lever 31 is brought down by the rider in the leftward direction in FIG. 11A with the motor control unit 34 left in the above-mentioned state, the rear wheels 4a, 4b are rotated to left at the same speed, and the wheelchair is moved to left, i.e. in the direction of an arrow $O_2$ with the rider remaining to face in the forward direction. When the lever 31 is inclined to diagonally left in the forward direction by the rider while the wheelchair is moved in the direction of the arrow $O_2$ as mentioned above, the number of revolutions per minute of the right rear wheels 4a is increased, so that the rear wheels 4a, 4b are directed as shown in FIG. 8C. Consequently, the wheelchair is moved laterally as the direction of advancement thereof is varied gradually to the direction shown with broken line $P_2$ in FIG. 11B, which is the same direction as the direction in which the lever 31 was brought down. Conversely, when the lever 31 is inclined to diagonally left in the backward direction by the rider while the wheelchair is moved in the direction of the arrow $O_2$, the number of revolutions per minute of the left rear wheel 4b is increased, so that the rear wheels 4a, 4b are directed as shown in FIG. 8C. Consequently, the wheelchair is moved in the direction shown in broken line $Q_2$ in FIG. 11C. While the wheelchair is moved laterally to right, the direction of advancement thereof can also be changed in completely the same manner as described above.

Thus, the motorized wheelchair according to the present invention has, in addition to the known operational modes of a motorized wheelchair, a novel operational mode, in which the wheelchair is moved either rightwards or leftwards with the rider remaining to face in the forward direction. The wheelchair according to the present invention is also advantageous in that the wheelchair can be moved laterally as the direction of advancement thereof is varied slightly in the direction, in which the unidirectional lever is brought down.

Figure 12:
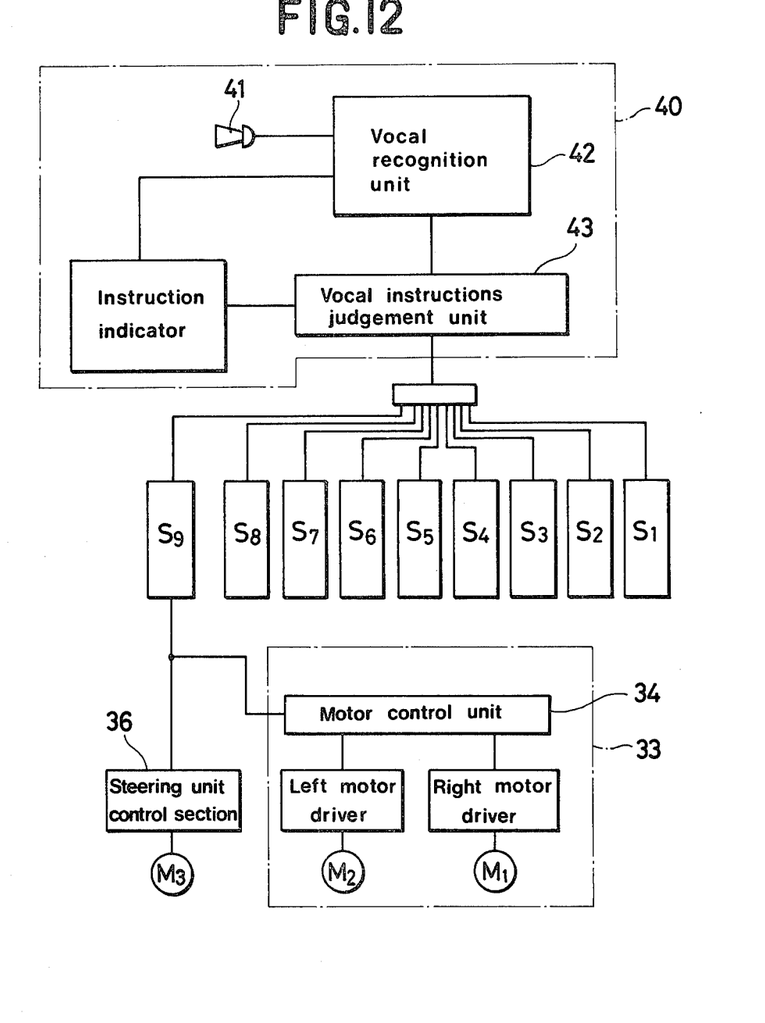
FIG. 12 is a construction diagram of a steering unit using a vocal actuator for the motorized wheelchair according to the present invention.

The above embodiment of the motorized wheelchair according to the present invention employs a unidirectional lever as means for steering the same. When this wheelchair is used by a higher-degree arm-and-leg-disabled person, who cannot use his hands, the vocal actuator 40 shown in FIG. 12 is provided thereon. When this vocal actuator 40 is used to judge or identify the user's registered vocal driving instruction words on the basis of his actual vocal instruction word inputted through a microphone 41, and thereafter any one of the motor control signals $S_1$–$S_9$ (FIG. 12) is taken out through vocal recognition unit 42 and vocal instructions judgement unit 43, the wheelchair can be moved in the same manner as mentioned above. Even when this wheelchair is used by some other type of disabled person, a device similar to the device referred to above, for taking out the same motor control signals as mentioned above can be prepared. Therefore, the unidirectional motorized wheelchair according to the present invention, which can be moved in all directions, can be used very conveniently by any type of disabled person by merely changing the control unit therefor.

The unidirectional motorized wheelchair according to the present invention described above permits being not only moved forward and backward, turned to right and left, and turned in a fixed position, but also moved to right and left with the rider facing forward, and regulated with respect to the direction of advancement while the wheelchair is moved laterally. Accordingly, this wheelchair permits reaching a destination accurately irrespective of the direction, in which the wheelchair faces while it is moved.

Therefore, the motorized wheelchair according to the present invention permits a leg-disabled person to carry out such kind of work that he has heretofore despaired of doing due to his inconvenient wheelchair, which cannot be moved laterally with his body left facing in the forward direction. The motorized wheelchair according to the present invention also permits a leg-disabled person to do a wider range of jobs.

What is claimed is:

1. An omnidirectional motorized wheelchair having front wheels consisting of a pair of free wheels, and rear wheels consisting of independent motor-operated wheels, comprising king pins, via which said motor-operated wheels are connected rotatably to a frame constituting a wheelchair body, tie rod arms connected fixedly to said king pins, a motor-operated steering unit provided between said motoroperated wheels and having a rotary steering shaft, and a pivotable member joined fixedly to said steering shaft, said pivotable member and said tie rod arms being connected together by tie rods, said motor-operated wheels being rotated in the opposite directions in accordance with the rotation of said steering shaft to set said motor-operated wheels to face in the lateral direction with respect to a rider.

2. An omnidirectional motorized wheelchair according to claim 1, wherein said tie rods are drawn in accordance with the rotation of said rotary shaft to cause said motor-operated wheels to be moved pivotally in the opposite directions.

3. An omnidirectional motorized wheelchair according to claim 1, wherein said tie rods are pushed out in accordance with the rotation of said rotary shaft to cause said motor-operated wheels to be moved pivotally in the opposite directions.

4. An omnidirectional motorized wheelchair according to claim 1, wherein said pivotable member consists of an arm, to both end portions of which said tie rods are pivotably connected, said arm being joined fixedly at an intermediate portion thereof to said rotary shaft.

5. An omnidirectional motorized wheelchair according to claim 1, wherein said pivotable member consists of a disc, said tie rods being connected pivotably to those portions of said disc which are opposed to each other with respect to said rotary shaft and which are on the same circle concentric with said disc.

6. An omnidirectional motorized wheelchair according to claim 1, wherein said wheelchair further includes a unidirectional lever and a steering unit-actuating switch, which are provided on a control box on said wheelchair body, and which permit the direction, in which said wheelchair faces, and the direction, in which said wheelchair is moved, to be varied independently of each other.

* * * * *